United States Patent [19]

Glass

[11] 4,310,849

[45] Jan. 12, 1982

[54] STEREOSCOPIC VIDEO SYSTEM

[76] Inventor: Stuart M. Glass, 1487 First Ave., New York, N.Y. 10021

[21] Appl. No.: 47,603

[22] Filed: Jun. 11, 1979

[51] Int. Cl.³ ............................................. H04N 9/58
[52] U.S. Cl. ................................. 358/88; 350/96.15; 358/250; 358/901
[58] Field of Search ..................... 358/88, 91, 92, 901, 358/250, 87, 191.1; 313/475; 350/130, 132, 133, 143, 96.18, 96.25, 96.26

[56] References Cited

U.S. PATENT DOCUMENTS

| | | | |
|---|---|---|---|
| 1,841,487 | 1/1932 | Lewis | 358/88 |
| 2,955,156 | 10/1960 | Heilig | 358/88 |
| 3,051,779 | 8/1962 | Lakjer | 358/87 |
| 3,079,462 | 2/1963 | Rosenthal | 358/191.1 |
| 3,216,778 | 11/1965 | Davies et al. | 358/901 |
| 3,520,587 | 7/1970 | Tasaki et al. | 358/901 |
| 3,748,016 | 7/1973 | Rossirt | 358/250 |
| 3,784,738 | 1/1974 | Natter | 358/88 |
| 3,833,300 | 9/1974 | Rymes | 358/250 |
| 4,032,970 | 6/1977 | Anderson | 358/901 |
| 4,153,913 | 5/1979 | Swift | 358/250 |
| 4,165,225 | 8/1979 | Auracher et al. | 350/96.15 |

Primary Examiner—Joseph A. Orsino, Jr.
Attorney, Agent, or Firm—Sprung, Felfe, Horn, Lynch & Kramer

[57] ABSTRACT

A stereoscopic video system includes the generation or simulation of two different monoscopic video images corresponding to the different views by a human's eyes of an original object and two display units for separately displaying the two monoscopic images. The two monoscopic images are flexibly coupled separately and directly from the display units to the eyes of a user by a headset.

14 Claims, 4 Drawing Figures

STEREOSCOPIC VIDEO SYSTEM

BACKGROUND OF THE INVENTION

The present invention relates to a stereoscopic video system and in particular to an improved apparatus for delivering the stereoscopic video image directly to the eyes of the viewer.

In stereoscopic video systems, the purpose is to present images to the eyes of a viewer which will give the viewer the impression of actually seeing the real object by creating a three-dimensional image thereof in the viewer's brain.

Many prior art systems are known which effect this result, such as anaglyphic and vectographic systems, orthoscopic image tubes and holographic displays such as shown in U.S. Pat. Nos. 3,473,872 and 3,878,329. In each of these systems, the images are viewed by the eyes of the viewer through an intermediate space which permits the viewer to have a peripheral visual awareness of his surrounding or visual setting, which is in most cases irrelevant to the image being viewed, and therefore amounting to what can best be described as "video noise".

Moreover, the known prior art systems utilize rigid optics, moving mechanical parts or other devices and require that the viewer's head remain in precise alignment with respect to the image being brought to the viewer's eyes.

Examples of these types of prior art systems are those disclosed in U.S. Pat. Nos. 3,860,752 and 3,525,807 wherein the apparent position of the image remains unaffected by small movements of the head; however, the brightness of the image is diminished and the image vanishes altogether with a significant rotation. These types of systems are extremely complicated to implement and require precise eye-to-image alignment and are therefore impractical.

Other prior art systems utilize mechanically moving parts such as light shutters to create the stereoscopic video imaging and these systems are therefore complex to build, unreliable for long term use and uneconomical except for a few particular applications.

SUMMARY OF THE INVENTION

The main object of the present invention is to eliminate the disadvantages of the prior art and to provide a stereoscopic video system and a headset for stereoscopic video viewing for extending the viewer's natural stereoscopic psycho-optical system to a remote place so that a sense of actual presence can be experienced by the viewer.

Another object of the present invention is to eliminate the video noise created by the immediate surroundings of the viewer to give the viewer a total visual involvement with the image.

To achieve this object, the video headset of the present invention has the purpose of bringing discrete left and right eye video information directly to the corresponding eyes of the viewer without the intrusion of video noise.

A further object of the invention is to provide a compact system wherein the viewer can freely move his head without a loss of clarity or contact with the stereoscopic video information to eliminate the fatigue that can be expected when one has his head remaining perfectly aligned with an image signal without the freedom of moving same without the loss of video clarity.

A still further object of the present invention is to provide for transmission of the video image in a reliable manner which utilizes no moving mechanical parts during use and is reliable both for commercial and home use.

Moreover, another object of the present invention is to provide a system which can adapt to the present television broadcast systems and provide an accurate stereoscopic video image output without necessitating changes to existing television broadcast conventions.

These and other objects of the present invention are achieved by the stereoscopic video system and the headset for stereoscopic video viewing according to the present invention. The system extends the natural stereoscopic optical system of the viewer to a remote place, thus providing the viewer with a virtually true-to-life stereoscopic visual experience.

According to the present invention, the origin of the stereoscopic image may be real, that is, resulting from that which is observed by a camera lens, or simulated, that is, an image which is computer-generated. In either case, right and left eye (or channel) information remains discretely separated during transmission from the source to the viewer, thus preserving the purity of the psycho-optical experience by the viewer.

Furthermore, by use of the headset of the present invention, the viewer's psycho-optical system can become physically linked to a discrete two-channel video display by means of flexible fiber optic means.

The discrete two-channel video display may utilize miniature cathode ray tubes which provide color or black and white images, solid state image displays such as LED matrix panels, liquid crystal displays or gas discharge displays. Each channel of the video display displays a different monoscopic view image, which when combined and transmitted to the viewer discretely via the fiber optic video transmitting headset, gives a stereoscopic image to the viewer.

The headset includes video output means comprising eye cups for delivering the video images to the eyes of the user without outside visual noise and means for retaining the eye cups in position on the user's head during use. The eye cups include a small lens system and become an optical adjunct to the viewer's optical system such that when brought into alignment with the eyes, and retained in place by a headstrap, the stereoscopic image is presented directly to the eyes and peripheral optical contact with the surroundings is eliminated, causing the psycho-optical system of the viewer to respond to the remote stereoscopic experience with a high sense of reality, spatial comprehension, size and depth perception.

The headset provides coupling between the two-channel video images and the eye cups and is preferrably two separate side-by-side flexible fiber optic bundles which can extend in length from two to fifteen feet, thus enabling the viewer to freely move about and to perform manual operations simultaneously with the video viewing.

The structure of the present invention lends itself as a viable system for facilitating an accurate stereoscopic video image output capability within the present television broadcasting system so as to enable stereoscopic video transmission utilizing conventional broadcasting channels.

This can be carried out by utilizing left and right video channel camera lenses disposed at approximately 65 mm apart so as to approximate the actual viewing of a video image by the human eyes. The output of one video camera can then be transmitted over a UHF broadcasting channel while the video image from the other camera is transmitted over a VHF station. Since both channels would be transmitting a slightly different monoscopic video image, there would be no disruption of normal television broadcasting to those persons having a standard television receiver.

In the stereoscopic system of the present invention, the television receiver for effecting stereoscopic viewing would only have to have the capability of receiving and demodulating the UHF and VHF channels simultaneously for display on the two miniature CRT's and to which the headset is coupled. The two tubes would display the two monoscopic video signals as seen by the two cameras on the transmitting end.

The system of the present invention also lends itself to the easy adaptation to computer generated simulated images. Computers already have the capability of creating CRT displays, and the only modification would be to provide a second CRT channel and have the computer generate the two monoscopic images thereon, whereupon the coupling of the headset of the present invention to the two CRT displays would enable stereoscopic imaging for a user. This system, and in particular as a result of the elimination of visual noise, has particular applications for navigation systems, where three dimensional images can be generated from sonar and radar devices, air traffic control systems, aircraft control systems for instrument piloting, etc., where the undisturbed presentation of a simulated stereoscopic image could be utilized for man-machine interface.

Another feature of the present invention is the ability to multiplex various headsets to the outputs of the two discrete CRT display tubes. This is achieved by multiplexing apparatus disposed at the coupling from the displays to the input of the fiber optics. The coupling includes means for releasably coupling at least one additional different flexible fiber optic bundle to each display so that the stereoscopic video images can be viewed by more than one user.

Numerous other features, objects and advantages of the invention will become apparent from the following specification when read in connection with the accompanying drawings wherein:

DETAILED DESCRIPTION OF THE PRESENT INVENTION

Figure 1:
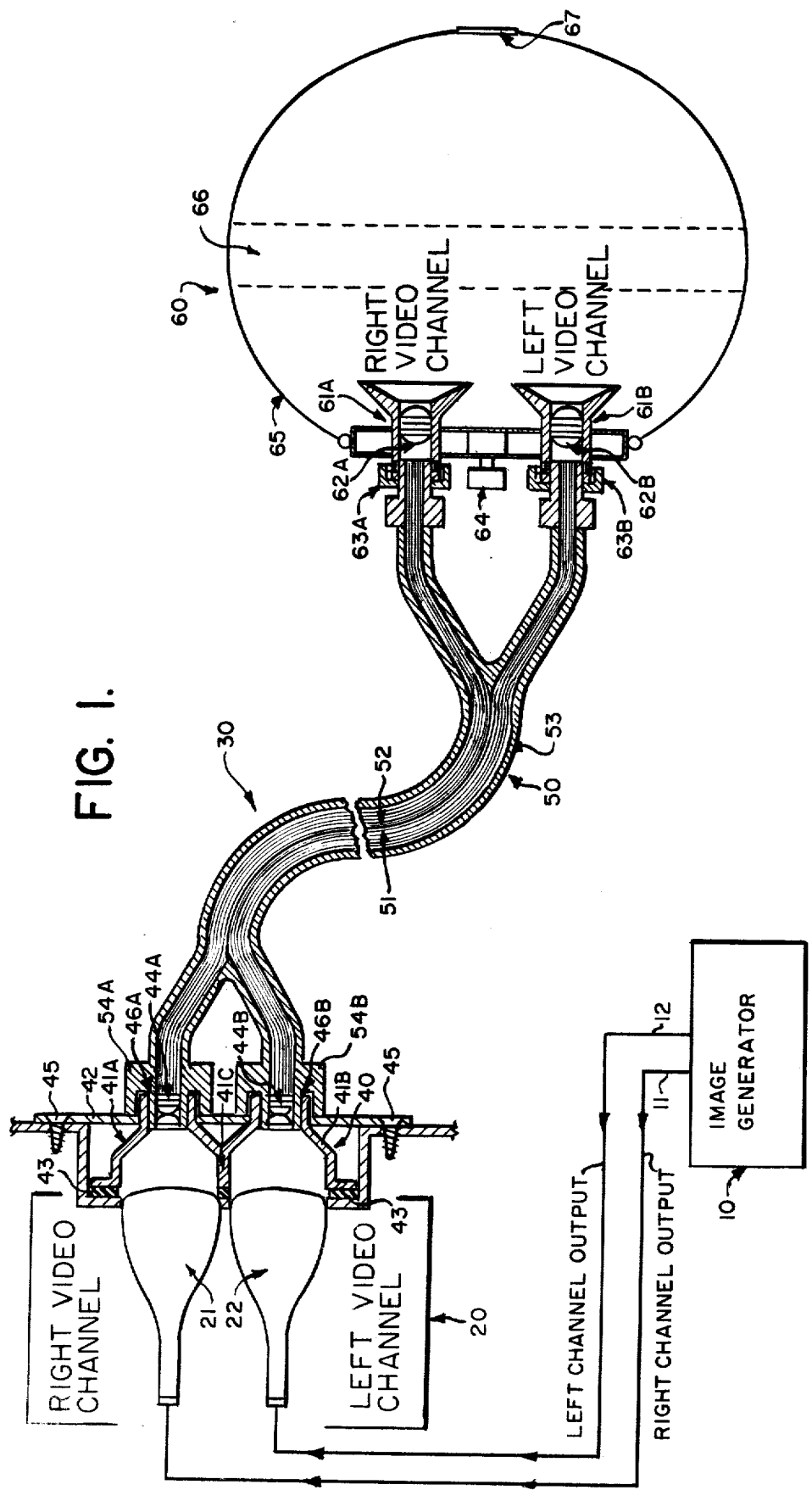
FIG. 1 is a sectional view of the headset of the present invention in the system of the present invention.

Referring now to FIG. 1, the stereoscopic video system of the present invention comprises means 10 for generating two different monoscopic video images corresponding to the different views by a human's eyes of an original object. This means 10 can be two spaced apart television cameras either feeding the video signals directly or first feeding a video tape storage unit prior to providing output signals 11 and 12 which correspond to right and left channels respectively, or the means 10 can be a computer which generates video output signals 11 and 12 to simulate a real object as would be seen by a human's eyes.

The output from the generating means 10 is fed to means 20 for separately displaying the two monoscopic images on lines 11 and 12. The means 20 as shown comprises two cathode ray tubes 21 and 22, but can alternatively be a solid state display devide such as a LED or liquid crystal display (LCD). In a preferred embodiment, miniature CRT's are utilized such as are used in miniature television receivers and in commercial television cameras to provide visual feedback to the user of the camera. Each CRT 21, 22 displays one monoscopic image, i.e. CRT 21 displays the image from the right channel which will be transmitted to the right eye of the viewer and CRT 22 displays the image from the left channel which is to be transmitted to the left eye of the user.

In order to transmit the displayed images from the CRT's 21 and 22 to the eyes of a user, means 30 are provided for flexibly coupling the two monoscopic images separately and directly from the display means 20 to the eyes of a user. The flexible coupling means 30 comprises a headset which includes video input means 40 connected to fiber optic means 50 which is in turn connected to a video output means 60 which directly couples each of the monoscopic video images to a different eye of the user.

The video input means 40 of the headset includes two dome-shaped light shields 41A and 41B which can be formed from any opaque rigid material. In the embodiment shown in FIG. 1, wherein the two CRT's 21 and 22 are disposed adjacent one another, the light shields 41A and 41B are interconnected so as to have a common intermediate wall 41C and a mounting flange 42.

The two light shields 41A, 41B are connected to the CRT's 21, 22 by way of a foam gasket 43 and by, for example locking screws 45 which fix a plate 42 and thus the light shields to provide a light-tight interface. When the light shields 41A and 41B are connected in place, aperture forming tubes 46A, 46B respectively therein are disposed opposite the CRT's 21, 22 along the longitudinal axis passing through the geometric center thereof.

The flexible fiber optic means 50 includes two fiber optic bundles 51, 52 of coherent glass or plastic fibers which are disposed side-by-side in the central portion thereof and which are separated from each other in both ends thereof. The individual fibers preferably have a diameter of about 10 to 25 microns and the bundle diameter is about 1.5 mm, with an overall length of about 2 to 15 feet. The central portion of the fiber optic bundle 51, 52 is surrounded by a flexible outer jacket 53 of opaque material preferably rubber or gooseneck metal preferably having an outer diameter of 7 mm. The outer jacket 53 limits the bending radius of the fiber optic bundles 51 and 52 to protect against fiber breakage. The jacket 53 also serves to separate the two fiber optic bundles at the end points thereof as shown. At the end portion of the fiber optic bundle adjacent the light shields 41A, 41B are disposed two sets of objective lenses 44A, 44B adjacent the ends of the fiber optic bundles 51, 52 respectively and within the jacket 53. The fiber optic bundles 51, 52 are mounted in place by bayonet connectors 54A, and 54B which coact with bayonet keys (not shown) on aperture tubes 46A, 46B to position the objective lenses 44A, 44B which serve to optically reduce the image from each CRT 21, 22 so as to transmit the entire display image therefrom through the associated fiber optic bundle and they preferably have a focal length of about 1.5 mm and are disposed from about 15 mm to 50 mm from the surface of the CRT's 21, 22.

On the other end of the flexible coupling means 50 is disposed the video output means 60 which comprises two eyepieces 61A, 61B, each focusable individually by means of a focus control 63A, 63B which moves the end of the fiber optic bundle adjacent thereto towards and away from the eye-piece lenses 62A, 62B disposed in the eye-pieces 61A, 61B respectively and which preferably have a magnification of about 10×. The eye pieces 61A, 61B are also adjustable with respect to their distance apart by means of a conventional eye-piece adjustment mechanism 64.

Figure 2:
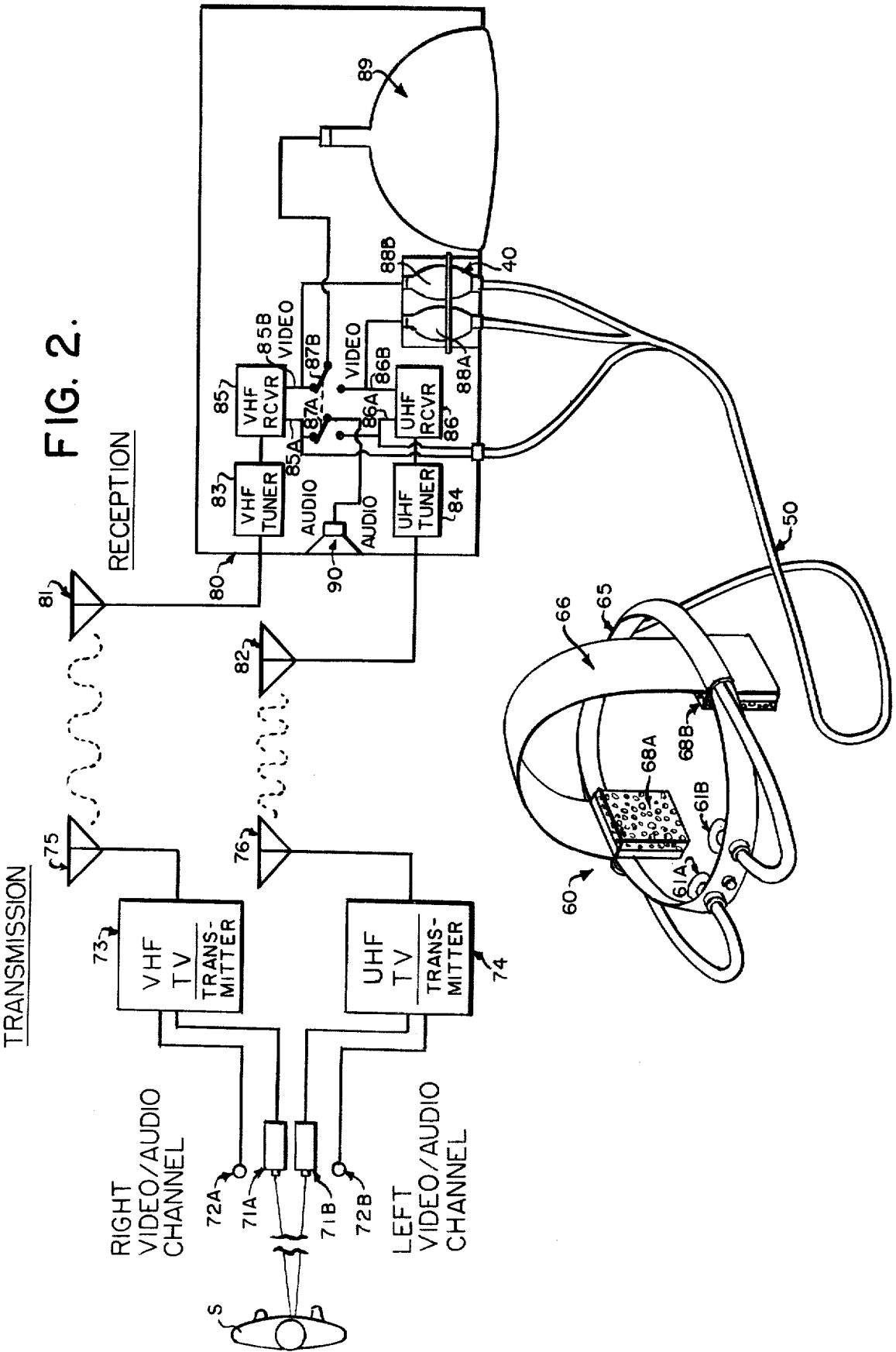
FIG. 2 is a schematic representation of one embodiment of the system of the present invention.

In order to enable the eye-pieces to be disposed directly over the eyes of a user so as to prevent video noise from interfering with the transmitter video image, a headband assembly is provided which includes headband 65 can include an adjustable clasp 67 to enable the wearing thereof by persons with different size heads. A three-dimensional view of a preferred embodiment of the headset is shown in FIG. 2. In this embodiment the fiber optic bundles depend from the rear of the headband to improve balance and comfort and so as to not interfere with the hands of the wearer.

Turning now to FIG. 2, a particular embodiment of the system of the present invention is shown in connection with a television broadcast system.

In the embodiment shown, the means 10 for generating the monoscopic vodeo images comprises two television cameras 71A, 71B which have their lenses spaced apart at an amount equal to the average eye spacing of the human being and focused on a subject S as shown. Also provided are microphones 72A, 72B which are disposed a given distance apart to provide a sterophonic recording of any sound emanating from the filmed subject. The audio signal from the microphone 72A and the video signal from the camera 71A constitute right channel information while the signals from the camera 71B and microphone 72B constitute left channel information. The right channel information is transmitted via a UHF transmitter 73 and antenna 75 while the left channel audio and video signals are transmitted by a UHF television transmitter 74 and antenna 76.

On the receiving end the means 20 for displaying comprises a conventional television receiver 80 having a main picture tube 89, a main speaker 90, VHF antenna 81 and UHF antenna 82 and which is modified only slightly with existing television components in order to provide for stereoscopic video viewing. Rather than having a single VHF/UHF tuner, two tuners 83, 84 are provided for VHF and UHF respectively and each of which is followed by standard television receiving circuitry for converting the signals received via antennas 81, 82 into video and audio signals which can be applied to tube 89 and speaker 90 respectively as in a standard television receiver. Instead, two miniature CRT display tubes 88A and 88B are provided which receive the video outputs 85B and 86B directly from the VHF and UHF receivers 85, 86 respectively and two earphones 68A and 68B are mounted on the headset 60 to receive the audio signals 85A, 86A from the receivers 85, 86 respectively. Thus, the modified television receiver can be tuned to both a VHF and a UHF station so as to simultaneously receive and demodulate the transmitted signals from the VHF station carrying right channel information, and the UHF station carrying left channel information and display same as right and left channel video simultaneously on CRT's 88A, 88B while the audio transmission thereof as right and left channel audio is being simultaneously played on earphones 68A, 68B. If one desires to utilize the television set in a conventional manner, switch 87 is provided which includes two ganged switches 87A and 87B, each of which alternatively connects tube 89 to either the VHF receiver video output or the UHF receiver video output and alternatively connects speaker 90 to the VHF audio or the UHF audio. Thus if one wishes to watch a VHF station, the switch 87 will be connected as shown in the user merely has to tune in the VHF tuner 83 to obtain the desired station. If a UHF station is desired to be watched, then the UHF tuner is turned in to the desired station and the switch 87 is thrown to the other state, whereupon tube 89 and speaker 90 receive their video and audio signals from the UHF receiver.

As a result of this system, a stereophonic audio transmission and a stereophonic video image are transmitted over conventional television transmission apparatus and necessitates only a slight modification to a conventional television receiver, utilizing well-known and off-the-shelf available circuit elements. Alternatively, elements 81–86 and 88A, 88B can be supplied in a separate box and used solely for stereoscopic viewing (with headset 60).

Figure 3:
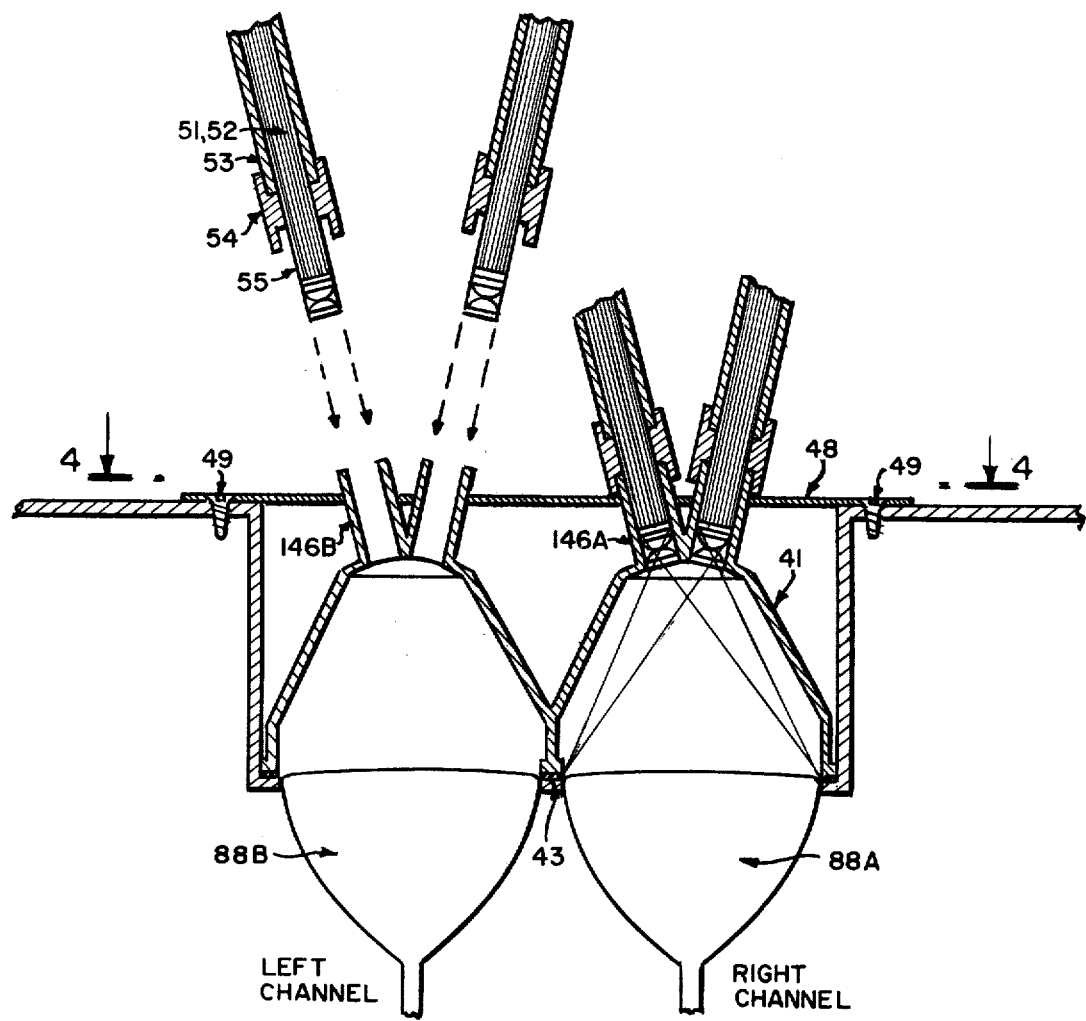
FIG. 3 is a sectional view along line 3—3 of FIG. 4 of a detail of another embodiment of the present invention.
Figure 4:
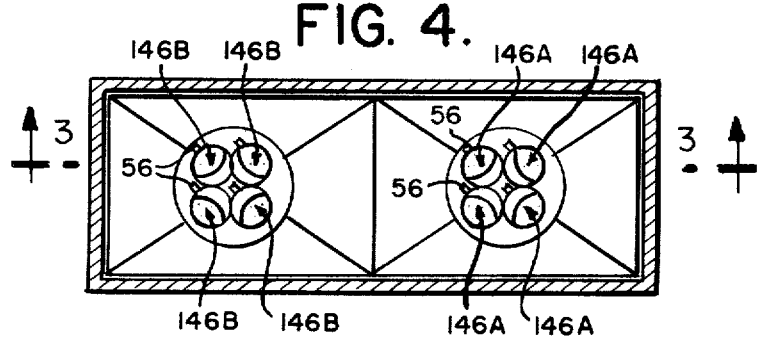
FIG. 4 is a sectional view along line 4—4 of FIG. 3.

FIGS. 3 and 4 relate to an alternative embodiment of the video input means 40 such as would be used in the television broadcast system shown in FIG. 2 wherein it would be desired to have more than one viewer viewing the same stereoscopic images from a single television receiver.

This result is carried out by multiplexing means which includes the light shield 41' having four image aperture defining tubes 146A, 146B for each information channel 88A, 88B. In the embodiment shown in FIG. 3, light shield 41' is fixed in place in an inset in the chassis on which it is mounted and held in place by plate 48 and screws 49.

The aperture tubes 146A, 146B are so situated at an angle to the longitudinal axis of the CRT's 88A, 88B such that the central focal point is approximately the center of the corresponding CRT screen and that field of view, which is preferably about 60°, is sufficient to view the entire surface area of the CRT screen.

The fiber optic bundles 51, 52 are coupled to the light shield 41' in a releasably locking manner so as to enable the easy connection for viewing. In the embodiment shown, up to four viewers may multiplex this single pair of CRT displays, and it will be readily apparent to those skilled in the art that the multiplex system can be configured so that the light shield 41' has two or three apertures symmetrically disposed about the center of the corresponding CRT screen.

The particular means shown for coupling the fiber bundles to the light shield aperture tubes 146A, 146B comprises a bayonet connector 54 which coacts with a bayonet key 56 of each aperture forming tube 146A, 146B. The bayonet connector and key also serve to align the vertical and horizontal axes of the image in relation to the fiber optics. At the end of each fiber optic bundle, forward of the bayonet connector 54, is the objective lens system 44A, 44B which is surrounded by a rigid jacket 55 to facilitate the insertion thereof into the tubes 146A, 146B and to prevent distortion of the transmitted image due to any bending of the bundle at the point where the lens and fiber optics meet.

A further embodiment of multiplexing a single CRT for more than one user, may comprise the use of a beam splitter which connects into the apertures 46A, 46B and has two arms for the connecting of connectors 54, thereto.

It is evident that those skilled in the art may now make numerous uses and modifications of the specific embodiments described herein without departing from the inventive concept. It is intended that the invention be construed as embracing each and every novel feature and combination of features of the apparatus and system as herein disclosed.

What I claim is:

1. A headset for stereoscopic video viewing comprising:
   a. video input means for directly coupling to a source of two different monoscopic video images to be viewed by a user corresponding to the different views by a human's eyes of an original object, the video input means comprising two optical coupling means each mountable over a different video image source and each having multiplex means including at least two output ports to enable the simultaneous viewing of the images thereof by more than one user at a given time;
   b. flexible fiber optic means having releasable coupling means at one end for connecting same to one output port of each optical coupling means for separately transmitting the two different monoscopic video images side-by-side; and
   c. video output means connected to the other end of the fiber optic means for directly coupling each of the two monoscopic video images to a different eye of the user and wherein the flexible fiber optic means provides a non-rigid connection between the video input and output means.

2. The headset according to claim 1, wherein each optical coupling means comprises an open faced dome-shaped member and wherein said at least two output ports comprise cylindrical tubes opening into the dome-shaped member at the end thereof opposite the open face and having the longitudinal axes thereof oriented towards the center of the open face.

3. The headset according to claim 2, wherein the video output means further comprises eye cups for delivering the video images to the eyes of the user without outside video noise and means for retaining the eye cups in position on the user's head during use.

4. The headset according to claim 3, wherein the video output means further comprises means for adjusting the distance of the eye cups to the eye spacing of the user.

5. The headset according to claim 3, wherein the video output means further comprises means for adjusting the focus of each eye cup.

6. The headset according to claim 3, further comprising a speaker for each ear of the user connected to the retaining means and positionable over the user's ears during use.

7. A stereoscopic video system comprising:
   a. means receptive of two different frequency monoscopic video image carrier signals, corresponding to the different views by a human's eyes of an original object, for separately displaying the two monoscopic images, the displaying means comprising first and second receiving channels each including means receptive of one carrier signal for obtaining an audio and video signal therefrom and a cathode ray tube for displaying the image corresponding to the video signal, wherein the means of the first channel comprises a VHF tuner and receiver and the means of the second channel comprises a UHF tuner and receiver;
   b. a main speaker, a main picture tube in addition to the two cathode ray tubes and switching means for applying the video and audio signals alternatively from the UHF and VHF channels, to the main picture tube and main speaker respectively; and
   c. means for flexibly coupling the two monoscopic images separately and directly from the displaying means to the eyes of a user, including two optical coupling means each connected over the screen of a different one of the two tubes.

8. The system according to claim 7, wherein the flexible coupling means comprises video input means for directly coupling to the displaying means, fiber optic means connected at one end to the input means for separately transmitting the two monoscopic video images side-by-side and video output means connected to the other end of the fiber optic means for directly coupling each of the two monoscopic video images to a different eye of the user.

9. The system according to claim 8, wherein the video output means further comprises eye cups for delivering the video images to the eyes of the user without outside video noise and means for retaining the eye cups in position on the user's head during use.

10. The system according to claim 9, wherein the video output means further comprises means for adjusting the focus of each eye cup.

11. The system according to claim 9, wherein the video output means further comprises means for adjusting the distance of the eye cups to the eye spacing of the user.

12. The system according to claim 9, further comprising a speaker for each ear of the user receptive of the audio signals from the two channels and connected to the retaining means and positionable over the user's ears during use.

13. The system according to claim 7, wherein the optical coupling means includes means for releasably coupling at least one additional different fiber optic means thereto to multiplex the video images to enable simultaneous viewing by more than one viewer at a given time.

14. The system according to claim 13, wherein each optical coupling means comprises an open faced dome-shaped member and wherein said at least two output ports comprising cylindrical tubes opening into the dome-shaped member at the end thereof opposite the open face and having the longitudinal axes thereof oriented towards the center of the open face.

* * * * *